June 23, 1936.  R. S. SANFORD  2,045,027
VEHICLE
Filed Jan. 21, 1932  2 Sheets-Sheet 1
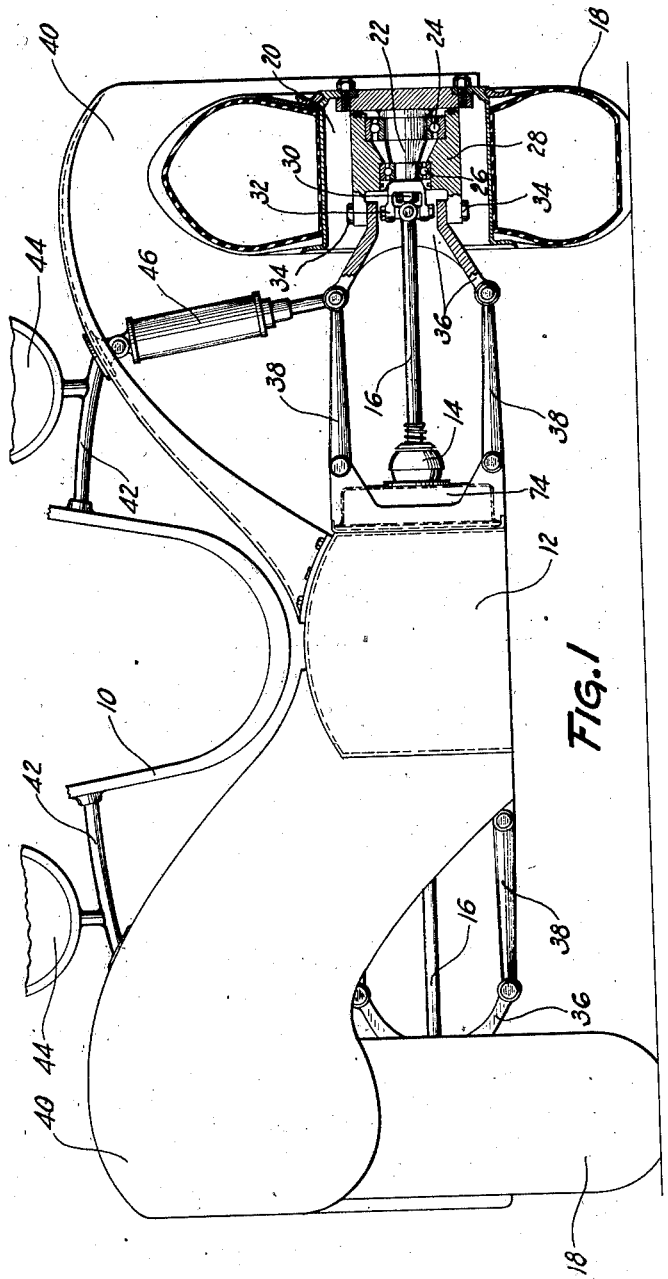
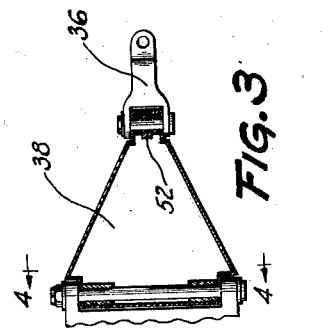
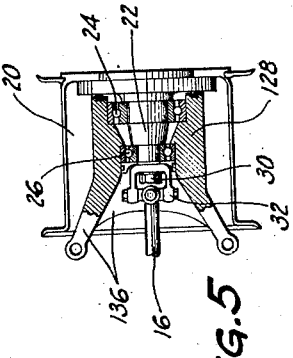
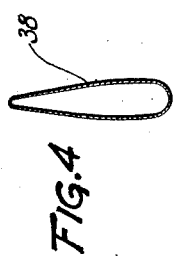
INVENTOR.
ROY S. SANFORD
BY
ATTORNEY Patented June 23, 1936

2,045,027

UNITED STATES PATENT OFFICE 2,045,027

VEHICLE

Roy S. Sanford, South Bend, Ind., assignor to Bendix Aviation Corporation, South Bend, Ind., a corporation of Delaware Application January 21, 1932, Serial No. 587,996

5 Claims. (Cl. 267—64)

This invention relates to vehicles, and is illustrated as embodied in an automobile chassis having individually-sprung wheels.

One of the objects of the invention is to secure the advantages of individual springing without the complication of the devices usually used for that purpose, preferably by an arrangement utilizing a novel unit combining the functions of a load-supporting spring and a shock absorber. In one desirable arrangement, each wheel is rotatably mounted on a member (including a swivel joint for steering in the case of a front wheel) which is jointed to the chassis by a novel parallel-link-motion device preventing horizontal displacement of the wheel but permitting it to move vertically against the resistance of a simplified and improved combination device which, in the form illustrated herein, has the functions of both a load-carrying device and a shock absorber.

Various features of novelty relate to the structural arrangement of the above-described individual spring suspension, to the mounting and driving of the wheel, to the provision of a truss to which the load-carrying spring device is connected, to the structure of the spring device itself and especially to the construction and arrangement for damping out road shocks without interfering with normal spring movement, and to other novel constructions and desirable combinations which will be apparent from the following description of the illustrative embodiment shown in the accompanying drawings, in which:

Figure 1 is a front elevation, partly broken away in transverse vertical section, of an automobile embodying my invention;

Figure 3 is a generally horizontal section through one of the parallel-motion links;

Figure 4 is a section through the link on the line 4—4 of Figure 3; and

Figure 5 is a view corresponding to part of Figure 1, but showing a rear wheel mounting.

Figure 2:
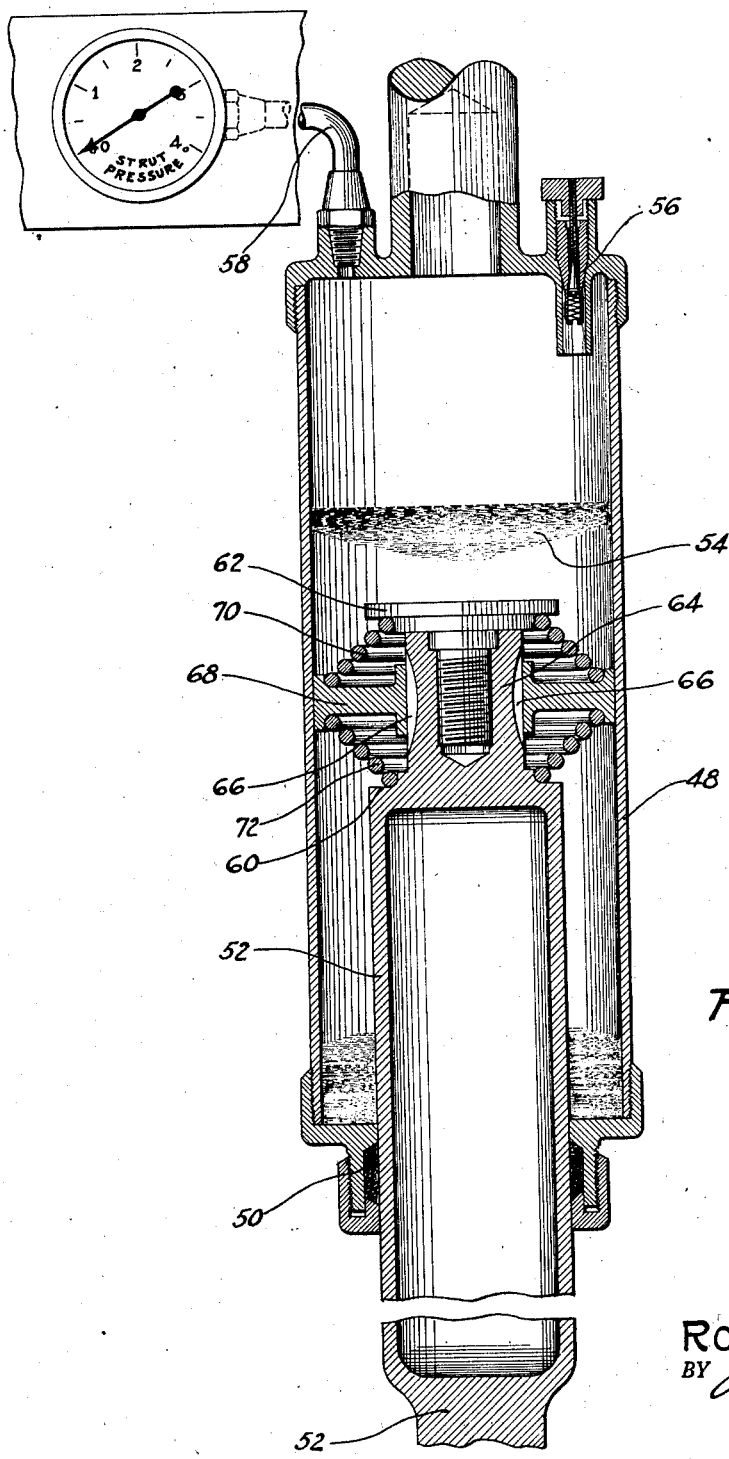
Figure 2 is a section through one of the combination load-carrying and shock-absorbing devices.

In the arrangement illustrated, the chassis includes a suitable frame carrying a radiator shell or support 10, behind which is the engine (not shown), a suitable driving unit or transmission 12 driven by the engine and in turn driving (through universal joints 14) the drive or axle shafts 16.

The road wheels are shown as including streamlined large-section low-pressure tires 18 mounted on small-diameter wheels 20 having central spindles 22 which may be journaled in bearings 24 and 26 carried by non-rotating wheel-supporting members 28. The spindles 22 are illustrated as secured by means such as nuts 30 to universal joints 32 connecting them to the drive shafts 16 and which also engage the inner bearings 26 to prevent axial outward displacement of the wheel assembly.

The members 28 which carry the wheels may be connected, by vertical pivots or swivels 34 permitting steering movement, to knuckles 36 which are connected to the chassis frame by novel upper and lower parallel-motion links or devices 38 connected at their outer ends by parallel horizontal pivots to the knuckles 36 and connected at their inner ends by parallel horizontal pivots to the chassis frame.

For lightness with strength, links 38 are shown made by welding pairs of steel stampings together face to face, and are generally in the shape of triangles in horizontal plan, with the bases of the triangles adjacent the chassis frame, and with the apices of the triangles at the connections to knuckles 36.

In the case of a rear wheel (Figure 5) the wheel-supporting member 128 and the knuckle 136 may be made integral, as it is not necessary for the wheel to have swiveling or steering movement.

The chassis may also include the usual fenders 40 connected to the radiator support 10 by braces 42 (shown carrying the headlamps 44), the fenders and braces forming trusses to which are pivoted the upper ends of novel load-carrying and shock-absorbing devices 46 (shown in detail in Figure 2), the lower ends of which are pivoted to the knuckles 36 (or 136).

Each device 46, in the embodiment illustrated, includes a double-acting cylinder 48 having at its lower end a packing or gland 50 forming a liquid-tight seal for a piston rod 52. The cylinder 48 is filled about two-thirds full of a suitable non-freezing liquid 54 such as mineral oil, a mixture of castor oil and alcohol, a glycol-sugar solution, or the like.

Above the liquid 54 is a yielding medium or spring, for example air under pressure introduced through a valve 56, which transmits the load of the chassis yieldingly from the cylinder 48 to the piston rod 52 (and therefore to the wheel 20) and which may be regarded as the equivalent in function of the usual vehicle spring. If desired, the space above liquid 54 could be connected by a suitable conduit 58 to a pressure gauge on the instrument board of the car.

The upper end of the piston rod 52 may be formed with a reduced diameter annular portion forming a lower shoulder 60 and an end head 62 screwed or otherwise attached thereto, and between which is a cylindrical portion 64 formed with grooves or liquid passages 66 of varying depth (i. e. deepest at the center and tapering toward both ends).

A floating piston 68 has a central hub slidably sleeved on portion 64 of the piston rod 52, in its central or normal position leaving passages 66 relatively unobstructed, but throttling those passages more or less when moved in either direction from that central or normal position. Piston 68 is yieldingly held in its central or normal position by upper and lower compression coil springs 70 and 72 held between the piston 68 and the head 62 and shoulder 60 respectively.

Normally there is no load on the piston 68, the weight of the car being transmitted through the cylinder 48, the air compressed in the top of the cylinder, and the liquid 54, directly to the piston rod 52 and thence to the wheel. In case of road shocks, or sudden vertical wheel movements for any other cause, however, the liquid 54 cannot pass quickly enough through passages 66 and displaces piston 68, thereby throttling the passages 66 more or less according to the amplitude and suddenness (velocity) of the vertical movements and acting as a shock absorber to damp them out. Smaller vertical movements, as in normal riding on a smooth pavement, are hardly affected at all, thus giving a very easy spring action on good roads.

The brakes 74 for the wheels may be mounted on the driving unit 12, acting on the drive shafts 16 through the universal joints 14. If it is not desired to have a front-wheel drive, the shafts 16 may still be provided to connect the wheels 20 with the brakes 74, thus permitting the use of larger-diameter and more powerful brakes than would be possible with the small wheels shown.

While one illustrative embodiment has been described in detail, it is not my intention to limit the scope of the invention to that particular embodiment, or otherwise than by the terms of the appended claims.

I claim:

1. A spring suspension device for an individually-sprung wheel comprising a cylinder and piston acting on each other through yielding load-supporting means, and auxiliary shock-absorbing means yieldingly resisting relative movement of the cylinder and piston in either direction from any normal position, the resistance being slight adjacent said normal position and increasing with the speed and amplitude of the relative movement in either direction.

2. A spring suspension device for an individually-sprung wheel comprising a cylinder and piston acting on each other through yielding load-supporting means, and auxiliary shock-absorbing means yieldingly resisting relative movement of the cylinder and piston in either direction from any normal position, the resistance being slight adjacent said normal position and increasing with the speed of the relative movement in either direction.

3. A shock absorber comprising a liquid-containing cylinder, a piston rod movable therein and having a variable external key slot passage for the liquid, and a yieldingly-supported piston encircling the piston rod and normally leaving both ends of said passage unobstructed but throttling the passage more or less when displaced.

4. A piston rod having an external passage located within the rod dimensions, a piston sleeved on the piston rod and throttling said passage when displaced from its normal position, and means yieldingly holding the piston in its normal position.

5. A spring suspension device for an individually sprung wheel comprising a cylinder and piston acting on each other through yielding load-supporting means, and auxiliary shock-absorbing means yieldingly resisting relative movement of the cylinder and piston in either direction from any normal position, the resistance being slight adjacent said normal position and increasing with the speed of the relative movement in either direction, said shock absorbing means comprising liquid in said cylinder, a rod extension on one side of said piston and a resiliently supported piston mounted thereon for movement in said liquid, said rod extension having a variable external key slot passage for said liquid adapted to be reduced with movement of said resilient supported piston in either direction from normal for varying the said resistance.

ROY S. SANFORD.